(12) United States Patent
Wendt

(10) Patent No.: US 10,999,098 B2
(45) Date of Patent: May 4, 2021

(54) DC-POWERED DEVICE AND ELECTRICAL ARRANGEMENT FOR MONITORING UNALLOWED OPERATIONAL DATA

(71) Applicant: SIGNIFY HOLDING B.V., Eindhoven (NL)

(72) Inventor: Matthias Wendt, Würselen (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 46 days.

(21) Appl. No.: 16/082,962

(22) PCT Filed: Mar. 2, 2017

(86) PCT No.: PCT/EP2017/054914
§ 371 (c)(1),
(2) Date: Sep. 7, 2018

(87) PCT Pub. No.: WO2017/153249
PCT Pub. Date: Sep. 14, 2017

(65) Prior Publication Data
US 2019/0068399 A1   Feb. 28, 2019

(30) Foreign Application Priority Data
Mar. 8, 2016 (EP) .................................... 16159088

(51) Int. Cl.
*G06F 1/00* (2006.01)
*H04L 12/40* (2006.01)
(Continued)

(52) U.S. Cl.
CPC ........ *H04L 12/40045* (2013.01); *H04L 12/10* (2013.01); *H04L 12/2821* (2013.01);
(Continued)

(58) Field of Classification Search
CPC ........... H04L 12/40045; H04L 63/1416; H04L 63/1425; H04L 12/2821; H04L 12/10; H05B 45/20
(Continued)

(56) References Cited

U.S. PATENT DOCUMENTS 8,558,413 B1 * 10/2013 Lepard ................ F21V 33/0052
307/150
9,661,120 B1 * 5/2017 Skeffington ......... H04L 12/2827
(Continued)

FOREIGN PATENT DOCUMENTS

EP   2819344 A1   12/2014
EP   2903238 A2   8/2015
(Continued)

OTHER PUBLICATIONS

Sabah Shamsh, et al., "Roaming Honeypots Along With IDS in Mobile AD-HOC Networks," International Journal of Computer Applications, vol. 69, No. 23, May 2013 (8 Pages).

*Primary Examiner* — Volvick Derose

(57) ABSTRACT

A DC-powered device (200) configured to receive DC power from an external power sourcing equipment (202) and to exchange operational data with the power sourcing equipment, the DC-powered device comprising an interface unit (206) comprising at least one connection unit (208) configured to receive the DC power from the power sourcing equipment and to exchange operational data with the power sourcing equipment, a data processing unit (214) connected to the interface unit and configured to compare the exchanged operational data with prestored allowed operational template data and to generate and store, in a storage unit (216), log data pertaining to unallowed operational data, the unallowed operational data being any exchanged operational data that does not correspond to the prestored allowed operational template data, and an operational unit (218), configured to execute operational instructions pertaining to that exchanged operational data corresponding to the prestored allowed operational template data.

14 Claims, 6 Drawing Sheets

(51) Int. Cl.
   *H04L 12/10* (2006.01)
   *H04L 12/28* (2006.01)
   *H04L 29/06* (2006.01)
   *H05B 45/20* (2020.01)
   *G06F 1/3203* (2019.01)

(52) U.S. Cl.
   CPC ...... *H04L 63/1416* (2013.01); *H04L 63/1425* (2013.01); *H05B 45/20* (2020.01); *G06F 1/3203* (2013.01)

(58) Field of Classification Search
   USPC .......................................................... 713/300
   See application file for complete search history.

(56) References Cited

U.S. PATENT DOCUMENTS

| | | | |
|---|---|---|---|
| 2003/0236870 A1 | 12/2003 | Boivie et al. | |
| 2006/0085543 A1* | 4/2006 | Hrastar | H04L 63/1408 709/224 |
| 2006/0161982 A1 | 7/2006 | Chari et al. | |
| 2006/0242701 A1* | 10/2006 | Black | H04L 45/00 726/22 |
| 2008/0018927 A1 | 1/2008 | Martin et al. | |
| 2008/0168283 A1* | 7/2008 | Penning | G06F 1/263 713/310 |
| 2008/0197790 A1* | 8/2008 | Mangiaracina | F21V 23/04 315/312 |
| 2009/0070603 A1* | 3/2009 | Diab | H04L 12/40045 713/300 |
| 2009/0228722 A1* | 9/2009 | Lin | H04L 12/10 713/300 |
| 2015/0188940 A1 | 7/2015 | Lapidous | |
| 2016/0055354 A1* | 2/2016 | Jinaraj | G06F 21/81 726/36 |
| 2016/0149713 A1* | 5/2016 | Wendt | H04L 12/10 307/1 |
| 2016/0337137 A1* | 11/2016 | Yseboodt | H04L 12/40039 |
| 2017/0111976 A1* | 4/2017 | Van Endert | H04L 12/10 |

FOREIGN PATENT DOCUMENTS

| | | |
|---|---|---|
| EP | 2913727 B1 | 9/2016 |
| WO | 2014088912 A1 | 6/2014 |
| WO | 2015110324 A1 | 7/2015 |

* cited by examiner

DC-POWERED DEVICE AND ELECTRICAL ARRANGEMENT FOR MONITORING UNALLOWED OPERATIONAL DATA

CROSS-REFERENCE TO PRIOR APPLICATIONS

This application is the U.S. National Phase application under 35 U.S.C. § 371 of International Application No. PCT/EP2017/054914, filed on Mar. 2, 2017, which claims the benefit of European Patent Application No. 16159088.0, filed on Mar. 8, 2016. These applications are hereby incorporated by reference herein.

FIELD OF THE INVENTION

The present invention is in the field of DC-powered systems such as for instance, but not limited to, Power over Ethernet (PoE) technology. It relates to a DC-powered device configured to receive DC power from an external power sourcing equipment and to exchange operational data with the power sourcing equipment. The invention also relates to an electrical arrangement, to a method for operating a DC-powered device, and to a computer program for controlling a control processor in controlling operation of an external DC-powered device.

BACKGROUND OF THE INVENTION

The use of networks of DC-powered devices in facility management employing, for instance, a PoE technology or a similar technology for providing power and control to the DC-powered network devices opens a risk of vulnerability to computer-based attacks from outside. In buildings, huge networks of thousands of interconnected DC-powered lighting devices and sensors that at the same time form communication nodes of the network are employed.

EP 2819344A1 discloses a Power-over-Ethernet (PoE) based lighting system.

WO 2014/088912A1 discloses a method for context aware network security monitoring. The monitoring is performed by generating a behavior profile for a user and comparing this to a baseline such that differences can be flagged.

WO 2015/110324A1 discloses an electrical arrangement in the form of a system for controlling distribution of power to DC-powered devices via network connections, e.g. in a local area network (LAN). DC-powered devices in the form of luminaires or other load elements can be provided with DC power provided by at least one power sourcing equipment via LAN connections, e.g. by power over Ethernet (PoE), without featuring an Internet Protocol (IP) node. This is attractive because with such a system the installation cost down benefits of PoE can be applied also to installations that do not require advanced controls. This means that to switch them on or off, the power supply on the LAN port of the switch must be enabled or disabled. When load elements and load controllers, e.g., lighting controllers or light switches are connected to the same switch, they are automatically paired to each other. This can be achieved through use of a network management protocol capability that some network switches have.

SUMMARY OF THE INVENTION

It has been recognized by the inventor that electrical arrangements comprising a plurality of DC-powered devices that exchange operational data with power sourcing equipment via network communication can be subject to security issues caused by intrusion and manipulation from outside. It is therefore an object of the present invention to increase the security of DC-powered devices suitable for use in electrical arrangements employing network connections and to increase the security of such electrical arrangements comprising DC-powered devices.

According to a first aspect of the present invention, a DC-powered device configured to receive DC power from an external power sourcing equipment and to exchange operational data with the power sourcing equipment is presented. The DC-powered device comprises:

an interface unit comprising at least one connection unit configured to receive the DC power from the power sourcing equipment, to provide the DC power internally within the DC-powered device and to exchange operational data with the power sourcing equipment;

a data processing unit connected to the interface unit and configured to compare the exchanged operational data with prestored allowed operational template data and to generate and store, in a storage unit, log data pertaining to unallowed operational data, the unallowed operational data being any exchanged operational data that does not correspond to the prestored allowed operational template data; and an operational unit, which receives the DC power from the interface unit, configured to execute operational instructions pertaining to that exchanged operational data corresponding to the prestored allowed operational template data.

The DC-powered device of the first aspect of the present invention is configured to receive DC power from an external power sourcing equipment and to exchange operational data with the power sourcing equipment. It has been further recognized by the inventor that electrical arrangements comprising a plurality of DC-powered devices having a limited functionality compared to their theoretical capabilities can be advantageously used as a network of honeypots to monitor and log unallowed access to the DC-powered devices or the electrical arrangement. A honeypot serves as a trap to detect and counteract attempts to make an unauthorized use of a DC-powered device having network communication capability by an attacker for purposes that are often foreign to the actual function of the operational unit of the DC-powered device. For the attacker, a DC-powered devices acting as a honeypot seems to contain valuable information or computational or communication resources.

Known honeypots are isolated from the network and only appear to be part of the network to an outside attacker. The DC-powered device of the present invention, however, is designed for use as a part of a network and provides honeypot functionality on top of the actual function of its operational unit.

Operational data, in the sense of the present invention, includes any data exchanged between the external power sourcing equipment and the DC-powered device. In some embodiments, the operational data comprises control data containing status information on an operational status of the DC-powered device, operational instructions providing one or more operations to be performed and parameters of such operations for defining a desired operational status of the DC-powered device. Allowed operational data of these types is defined by prestored allowed operational template data.

However, in reality, operational data may also comprise unexpected control data or unexpected operational instructions, which are not defined by the prestored allowed operational template data and which might therefore be originated by a potential attacker and potentially intended to make unallowed use of the DC-powered device. Such unexpected operational data that does not correspond to the prestored allowed operational template data is considered unallowed operational data.

Both DC-power and operational data are received or exchanged via an interface unit comprising at least one connection unit. The exchanged operational data is compared in a data processing unit with prestored allowed operational template data. Allowed operational template data is suitable for defining allowed operational data. This definition typically corresponds with an intended or acceptable use of the DC-powered device according to its specifications.

When the data processing unit determines that the exchanged operational data corresponds to the allowed operational data included in the allowed operational template data, the DC-powered executes a corresponding operational instruction, thus guaranteeing its expected functionality.

Additionally, the DC-powered device is advantageously configured to generate log data pertaining to the operational data that does not correspond to the allowed operational data included in the allowed operational template data, and which is thus regarded as unallowed operational data.

The log data pertaining to respective unallowed operational data thus contains information on a respective detected event of receiving the unallowed operational data, and includes information on the unallowed operational data received. This log data is stored in a storage unit allowing non-volatile storage. Therefore, the DC-power device does not simply disregard the exchanged unallowed operational data, but it keeps log data that can be useful to for later evaluation, for instance for maintaining a filter for blocking unallowed attempts to access the DC-powered device.

In the following, embodiments of the DC-powered device of the first aspect of the present invention will be described.

Once an attempt of unallowed access to the DC-powered device has been detected and log data pertaining to that access has been stored, it is desirable that the potential attacker remains oblivious of the fact that the unallowed access attempt has been detected. A way to ensure this is to allow the DC-powered device to respond to a predetermined number of unallowed operational data, always under controlled conditions that do not put at risk the DC-powered device or a network to which the DC-powered device is attached. To this end, in an embodiment according to the first aspect of the present invention, the data processing unit of DC-powered device is further configured to compare the unallowed operational data with prestored extended functionality template data, and the operational unit is further configured to execute operational instructions pertaining to that unallowed operational data corresponding to the prestored extended functionality template data. Different embodiments allow for the execution and exchange of different operational instructions forming different subsets of unallowed operational data which are defined by the prestored extended functionality template data. This increases the chance that an attacker who is attempting to access to the DC-powered device remains unaware that the attempt has been detected and log data pertaining to the attempt is being generated and stored. By defining which operational instructions pertaining to at least part of the unallowed operational data can be exchanged and executed, the DC-powered device can present itself to the potential attacker as a different device having an extended functionality, thus preserving its original functionality and acting as a honeypot in addition to it.

Information that is included in the log data in some embodiments concerns payload content or instruction content or both, circumstances of receiving the unallowed operational data, such as a point in time at which the operational data was exchanged, for instance in the form of a so called time stamp, information on a device identification of a device sending the unallowed operational data, or on a current operational status of the DC-powered device at the time of receiving the unallowed operational data.

A further embodiment of the DC-powered device is configured to detect a reoccurrence of a given unallowed operational data by detecting a predefined minimum amount of data overlap with unallowed operational data already stored in a log data entry, and to generate and replace the log data entry by a compressed log data entry, the compressed log data entry providing an identification of the given unallowed operational data and of a number of reoccurrences of the given unallowed operational data. The predefined amount of data overlap with unallowed operational data already stored in the log unit in form of a log data entry can be advantageously determined so as to implement data compression by avoiding storage of reoccurring and thus redundant operational data and therefore reduce the amount of storage capacity needed. The decision on when a sufficient amount of overlap is present is in some embodiments performed based on a predetermined similarity criterion between a stored set of operational data and a reoccurring set of operational data. A set of operational data is for example formed by a certain control instruction containing a control command and control parameters further specifying the control command In some embodiments the predetermined similarity criterion requires a complete overlap to be fulfilled, i.e., the reoccurring operational data are fully identical to previously stored operational data. In other embodiments only a partial overlap, i.e., only identity with a subset of previously stored operational data, is required for triggering the generation of a compressed log data entry. The log data stored in cases where a plurality of unallowed operational data having a predetermined minimum amount of data overlap is exchanged comprises, in some embodiments, only log data pertaining to one of the reoccurring sets of unallowed operational data.

In other embodiments, the log data comprises a first exchanged operational data having a predetermined amount of data overlap with successive operational data and time stamps pertaining to all or to a subset of the operational data having a predetermined amount of data overlap.

In other embodiments according to the first aspect of the present invention, the prestored allowed operational template data further comprises port template data defining a limited set of allowed software communication ports to be used for exchanging the operational data. In these embodiments, the data processing unit is further configured to identify, within the respective exchanged operational data, software communication port data and to compare it with the set of allowed software communication ports. These embodiments, thus, treat any operational data received or to be sent via another software communication port than any of the allowed software communication ports as unallowed operational and, therefore, generate and store log data pertaining to the operational data which include references to an unallowed software communication port. In DC-powered devices with a limited functionality, the number of allowed software communication ports is small compared to other devices with larger functionality ranges. Splitting the exchanged operational data in allowed and unallowed operational data based on the software communication ports addressed by the operational data is therefore, advantageous to distinguish between allowed and unallowed access attempts to the DC-powered device. Some embodiments further allow the exchange and execution of operational instructions addressed at software communication ports that are not intended to be used by the device in the frame of its non-honeypot related functionality, i.e. the functionality defined by the allowed operational template data. The potential attacker will be thus lead to believe that he is actually accessing and/or in control of a device having certain functionalities, while log data pertaining to the attacker's activity is being stored.

In another embodiment according to the first aspect of the present invention, the operational unit is a luminaire unit comprising lamps configured to emit light in dependence on control information provided by that received operational data that is in correspondence with the prestored allowed operational template data. Since luminaries used as DC-powered devices have a limited functionality requiring only limited data processing capability, i.e., operate in accordance to a limited set of allowed operational data, they enable defining a clear distinction between the allowed operational data and a wide range of unallowed operational data to be monitored, and also provide sufficient processing capacity for monitoring any exchange of unallowed operational data involving the luminaire of the present embodiment of the DC-powered device.

In other embodiments, an in order to guarantee the execution of operational instructions pertaining to that exchanged operational data corresponding to the prestored allowed operational template data, the data processing unit is configured to determine whether the luminaire unit is in an active or inactive operational state and to generate and store the log data only when the luminaire unit is in an inactive operational state. Thus, the honeypot functionality is active only at certain times. In yet another embodiment, the certain times of active honeypot functionality are determined based on a time schedule, for example based on scheduled times of inactivity of the luminaire. For instance, the honeypot functionality of luminaires for use inside a building may be scheduled to be activated at night hours only, when the luminaires can be expected to be inactive.

According to a second aspect of the present invention, an electrical arrangement is provided. The electrical arrangement comprises at least one power sourcing equipment configured to provide DC power to at least one or more DC-powered devices and to exchange operational data with the one or more DC-powered devices, wherein at least one of the one or more DC-powered devices connected to the power sourcing equipment is a DC-powered device according to the first aspect of the present invention or any of its embodiments. The electrical arrangement will hereinafter also be referred to in short as the arrangement.

In some embodiments, the arrangement includes a plurality of DC-powered devices according to the first aspect of the present invention. In other embodiments, each of the DC-powered devices in the arrangement is advantageously configured to execute different subsets of unallowed operational data so as to provide to a potential attacker the illusion of a network comprising a variety of networked devices with different functionalities. By increasing the number of DC-powered devices in the arrangement, the possibility of an attacker attempting to access a DC-powered device of the first aspect of the present invention increases. An unallowed access to the DC-powered devices in the present arrangement does therefore not compromise the security of the arrangement, protects any other external devices that may be more sensitive to attacks and collects data regarding the intended unallowed usage of the DC-powered device, which may be used learn the modus operandi of the potential attacker. These DC-powered devices are not solely dedicated to the task of storing log data pertaining to unallowed operational data but are also configured to execute at least instructions pertaining to allowed operational data.

In other embodiments the electrical arrangement further comprises a monitoring device which is configured to access the log data stored in the storage unit of the DC-powered device and to output, via a user interface, output data pertaining to the accessed log data. These embodiments enable the monitoring device to access the log data stored. The log data lists the unallowed attempts to access the device and output to a user (e.g. an operator or another device) via a user interface output data pertaining to the accessed log data. In some embodiments the output date comprises a full list of the log data stored, whereas in other embodiments the output data comprises processed log data according to predetermined processing parameters. The monitoring device is, in some embodiments, a unit integrated in the power sourcing equipment. In other embodiments the monitoring device is integrated in a DC-powered device forming part of the electrical arrangement. In yet other embodiments the monitoring device is an independent device, in the sense that it is not integrated in a device within the arrangement. Using the monitoring device, the arrangement is configured to output to a user (e.g. an operator, an external data processing device, etc.) data pertaining to the log data, which can for example be further be used to monitor the unallowed access attempts and to learn about the attacker's strategies or the intended unallowed use of the DC-powered device or the electrical arrangement.

It would be further advantageous for a user to be able to initialize or modify the allowed operational template data or the extended functionality template data in the DC-powered devices to set and control the use of the DC-powered device as a honeypot. In other embodiments according to the second aspect of the present invention, the electrical arrangement further comprises a management device configured to receive via a management input interface the allowed operational template data or the extended functionality template data and to transmit via a management output interface the allowed operational template data or the extended functionality template data to the DC-powered device. In these embodiments, the DC-powered device is configured to receive the allowed operational template data or the extended functionality template data and to store the allowed operational template data or the extended functionality template data so that the data processing unit is configured to compare the operational data with the allowed operational template data or the extended functionality template data. In cases where there is already a prestored template data, some embodiments are configured to overwrite the totality or part of the prestored template data with the transmitted template data. Some embodiments are configured to receive and transmit both the allowed operational template data and the extended functionality template data.

The management device, which in some of these embodiments is a management unit integrated into the PSE or in one of the DC-powered devices in the electrical arrangement is thus configured to store in a given DC-powered device, maintain or change a desired set of unallowed operational data whose operational instructions will be executed by the DC-powered device. In this way, the potential attacker is led to believe that he or she is in control of the arrangement or has gained access to it. These embodiments enable a dynamic change of a honeypot functionality (i.e. the functionality defined by the extended functionality template data) of the system. This change of the honeypot functionality is in some embodiments triggered by an external user.

In some embodiments, the management device is configured to switch on the extended functionality of a given DC-powered device only during predetermined monitoring periods. The provision of extended functionality is thus switched off at other times. In other embodiments, the management device is configured to dynamically change the extended functionality template data and, therefore, the operational instructions pertaining to certain unallowed operational data that can be executed by the DC-powered device.

The management device is in other embodiments configured to be in data communication with the electrical arrangement via a cable, such as a standard patch cable. In other embodiments the management device and the power sourcing equipment or at least one of the DC-power devices has wireless communication capabilities which are used by the management device to transmit the allowed operational template data or the extended functionality template data.

In some embodiments, the electrical arrangement is a Power over Ethernet (PoE) arrangement comprising power sourcing equipments and DC-powered devices in the sense of PoE technology. In some of these embodiments, the PoE arrangement is a networked lighting system, where the DC-powered devices comprise, among other devices, luminaires, switches devices and/or presence sensors. In this particular example of an electrical arrangement, the DC-powered devices, despite having the hardware necessary to implement different functions, have a limited number of allowed operations, which include, for example, switching on a certain DC-powered luminaire, switching off a certain DC-powered luminaire, changing the light intensity of a certain DC-powered luminaire or changing the light spectrum of a certain DC-power luminaire, among other allowed operations.

In some embodiments the luminaires are configured to execute allowed operational instructions pertaining to lighting control commands, such as operational instructions to be switched on, switched off or to vary the lighting intensity or color upon the reception of the respective operational data via a predetermined software communication port, such as for example http port 80. Such an arrangement is particularly advantageous, since operational data addressed to other software communication ports or addressed to the allowed software communication port but pertaining to instructions not executable by the DC-powered device can be monitored without compromising the lighting functionality of the arrangement.

In other embodiments the DC-powered device has stored files with random content that may be manipulated by the potential attacker, for example addressing an FTP software communication port, so that the attacker is led to believe that he or she is in control of the device, when he or she is actually lurking on a secured environment while being monitored.

According to a third aspect of the present invention, a method for operating a DC-powered device configured to receive DC power from an external power sourcing equipment and to exchange operational data with the power sourcing equipment is presented. The method comprises:

exchanging operational data with the power sourcing equipment;

comparing the exchanged operational data with prestored allowed operational template data;

generating and storing, in a storage unit, log data pertaining to unallowed operational data, the unallowed operational data being that exchanged operational data that does not correspond to the prestored allowed operational data; and executing operational instructions pertaining to that exchanged operational data corresponding to the prestored allowed operational template data.

In some embodiments, the process further comprises comparing the unallowed exchanged operational data with prestored extended functionality template data and executing operational instructions pertaining to the unallowed operational data corresponding to a prestored extended functionality template data.

According to a forth aspect of the present invention, a computer program for controlling a data processing unit in controlling operation of a DC-powered device, the computer program comprising program code for causing the data processing unit to carry out the steps of the method according to the third aspect of the present invention or one of its embodiments, when the computer program is run on the data processing unit.

An alternative computer program in accordance with the forth aspect controls the data processing unit to carry out only the following steps:

comparing the exchanged operational data with prestored allowed operational template data;

generating and storing, in a storage unit, log data pertaining to unallowed operational data, the unallowed operational data being that exchanged operational data that does not correspond to the prestored allowed operational data.

The computer programs of the forth aspect share the advantages of the method of the third aspect of the invention.

The following description returns to further embodiments of the electrical arrangement making use of the computer program of the forth aspect of the invention. In some embodiments of electrical arrangements, the management device is additionally configured to receive via the management input interface the computer program of the forth aspect and to instruct at least one DC-powered device to install the computer program for execution during operation. These embodiments are thus advantageously configured to upload the computer program into existing DC-powered devices, which may or may not have already the honeypot functionality implemented. This means that some embodiments transform an existing DC-powered device forming part of an electrical arrangement into a DC-powered device according to this invention implementing a honeypot functionality.

In a fifth aspect of the present invention, a method for operating an electrical arrangement is presented. The method comprises operating at least one power sourcing equipment for providing DC power to at least one or more DC-powered devices and for exchanging operational data with the one or more DC-powered devices, wherein at least one of the one or more DC-powered devices connected to the power sourcing equipment is a DC-powered device perform a method according to the third aspect of the present invention In some embodiments the method of the fifth aspect further comprises accessing the log data stored in the storage unit of the DC-powered device and outputting, via a user interface, output data pertaining to the accessed log data.

In other embodiments, the method further comprises receiving via a management input interface the allowed operational template data and transmitting via a management output interface the allowed operational template data to the DC-powered device.

In another embodiment the method comprises receiving via the management input interface the extended functionality template data and transmitting via the management output interface the extended functionality template data to the DC-powered device.

The methods of the third and fifth aspects of the present invention share the advantages presented in the context of the device of the first aspect of the present invention.

It shall be understood that the DC-powered device of claim 1, the electrical arrangement of claim 6, the method for operating a DC-powered device of claim 10, the computer program of claim 12 and the method for operating an electrical arrangement of claim 14 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
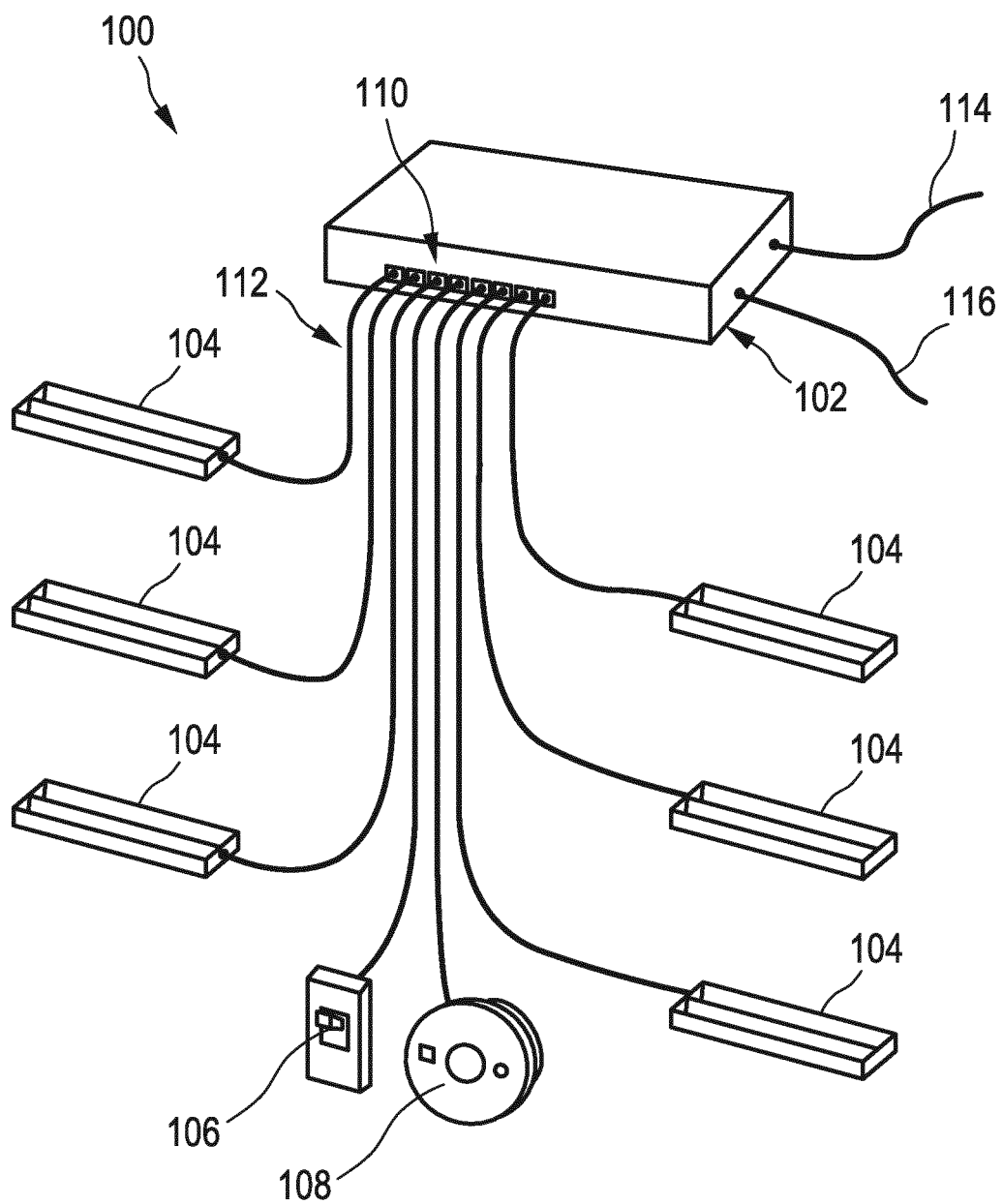
FIG. 1 shows a block diagram of an embodiment of an electrical arrangement.

FIG. 1 shows an exemplary embodiment of an electrical arrangement 100 for a networked lighting application. The electrical arrangement 100 comprises a power sourcing equipment (PSE) 102 configured to provide DC-power supply to and to exchange operational data with a plurality of DC-powered devices 104, 106 and 108, which are connected to connection units 110 of the PSE via Ethernet cables 112. These cables are adapted to convey the provided DC-power along with operational data. Operational data include any data exchanged between the external power sourcing equipment and the DC-powered device and comprises e.g. control data, operational instructions intended to operate the device, unexpected instructions which might be originated by a potential attacker and which might be intended to make unauthorized or unallowed use of the DC-powered device, etc. The PSE 102 receives an input power via an electrical connection 114 that may be directly connected to a mains outlet (not shown). It is also configured to exchange operational data with another external device (e.g. a switch, a router, another PSE, etc.) via another Ethernet cable 116. The DC-powered devices in the exemplary arrangement depicted in FIG. 1 include six luminaires 104, one switching element 106 and one presence sensor 108. Other arrangements comprise different numbers of DC-powered devices and PSE. In the electrical arrangement depicted in FIG. 1, the DC-powered devices can be configured so that the switching element 106 and/or the presence sensor 108 send, via the PSE 102, operational data pertaining to operational instructions intended to alter a current status of one or more of the luminaires. A typical set of allowed operational data would be that intended to switch on, switch off or vary the light intensity or the light spectrum of one or more luminaires. This operational data can also be generated outside the electrical arrangement 100 and sent to the PSE via the Ethernet cable 116. In this way, a user may control the current status of the luminaires 104 without having to physically act on the switch 106 or be detected by presence sensor 108. In other embodiments the PSE is also configured to exchange data with external devices via a wireless connection (not shown).

Figure 2:
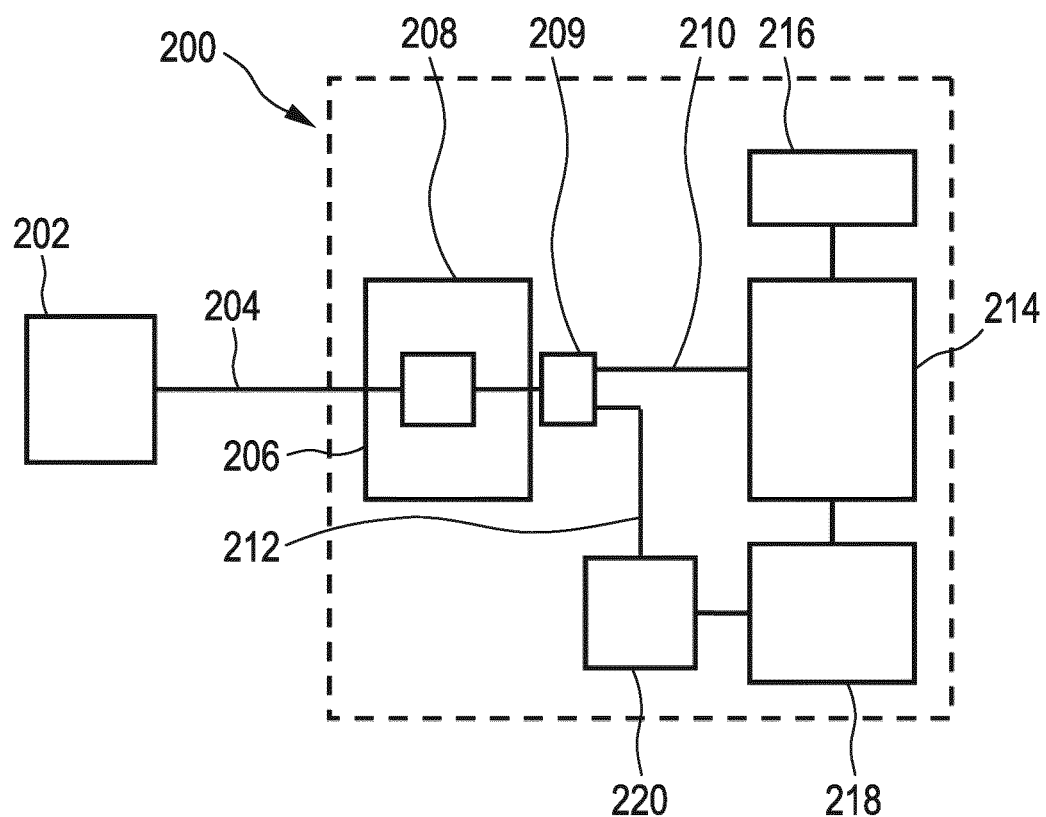
FIG. 2 shows a block diagram of an embodiment of a DC-powered device connected to an external power sourcing equipment.

FIG. 2 shows an exemplary block diagram of an embodiment of a DC-powered device 200 connected to an external power sourcing equipment 202. In this example, the DC-powered device is a DC-powered lighting device or luminaire which comprises a light source 220. The DC-powered device 200 is configured to receive DC power from the external power sourcing equipment 202 and to exchange operational data with the PSE via an Ethernet cable 204. The DC-powered device comprises an interface unit 206 comprising at least one connection unit 208 configured to receive the DC power from the power sourcing equipment 202 and to exchange operational data with the power sourcing equipment. In the DC-powered device, the DC-power and the operational data are split, in a splitting unit 209, into operational data that follows an operational data path 210 and a power signal that follows a power path 212. The DC-powered device also comprises a data processing unit 214 connected to the interface unit via the operational data path and configured to compare the exchanged operational data with prestored allowed operational template data. In this DC-powered lighting device forming part of a Power over Ethernet electrical arrangement, the allowed operational template data includes data pertaining to instructions intended to, for example, switch on, switch of or change the illumination intensity or the light spectrum by a predetermined amount. The DC-powered device 200 is not only configured to execute operational instructions pertaining to the mentioned allowed operational data but also to generate and store, in a storage unit 216, log data pertaining to unallowed operational data, the unallowed operational data being any exchanged operational data that does not correspond to the prestored allowed operational template data. The instructions pertaining to the allowed operational template data (e.g. switch on/off, change intensity, change spectrum, etc.) are executed by the operational unit 218. The operational unit 218 operates the device load 220 (e.g. an LED light source) which is powered by the DC-power received via the power path 212 according to the operational instructions.

Some DC-powered devices are also configured to compare the unallowed operational data with prestored extended functionality template data, and to execute operational instructions pertaining to that unallowed operational data corresponding to the prestored extended functionality template data Other DC-powered lighting devices are configured to listen to allowed operational data addressed to a predetermined set of allowed software communication ports (e.g. xClip on http port #80). The functionality of the DC-powered device is further extended to accept also unallowed operational data received via the allowed software communication port and/or unallowed operational data received via unallowed software communications ports. For example log data pertaining to operational data received via port 80 but not intended to modify the current status of the lighting device is stored in the storage unit. Also, log data pertaining to other operational data received via any unallowed ports is stored in the storage unit. This implies that the device has other software communication ports open (e.g. SMPT, Telnet, FTP, etc) apart from the allowed one (e.g. http). As the functionality related to those other software communication ports is not implemented in the DC-powered lighting device, the DC-powered device poses as a realistic fake of a more complex device with extended functionality. An potential attacker believes he or she has accessed a real system and is exploiting a security hole, but he or she is actually lurking on a secure "sandbox" environment, while the operational data exchanged during the unallowed access is being monitored. Some of the DC-powered devices may contain data pertaining to fake user accounts, fake system files, etc. Some DC-powered devices also allow for manipulation of the fake user accounts, the fake system files, etc by opening for example the unallowed FTP software communication port.

Some DC-powered devices also implement a storage unit overflow management strategy. In these embodiments, the data processing unit is configured to detect a reoccurrence of a given unallowed operational data by detecting a predefined minimum amount of data overlap with unallowed operational data already stored in a log data entry. It also generates and replaces the log data entry by a compressed log data entry. This compressed log data entry provides identification of the given unallowed operational data and of a number of reoccurrences of the given unallowed operational data. For example, in case a plurality of unallowed operational data having a predetermined minimum amount of data overlap is exchanged, the data processing unit is configured to generate and store, in the storage unit, log data pertaining to only a subset of the plurality of unallowed operational data having a predetermined minimum amount of data overlap. In some embodiments, the log data includes only the first and the last message having the predetermined amount of overlap (e.g. the same addressed software communication port, or the same intended operational instruction, such as for example, transfer a file, access a data sector, etc, independently of the file to be transferred, the data sector to be accessed, etc), together with data pertaining to a point in time at which the operational data was exchanged, i.e. a so called time stamp.

Figure 3:
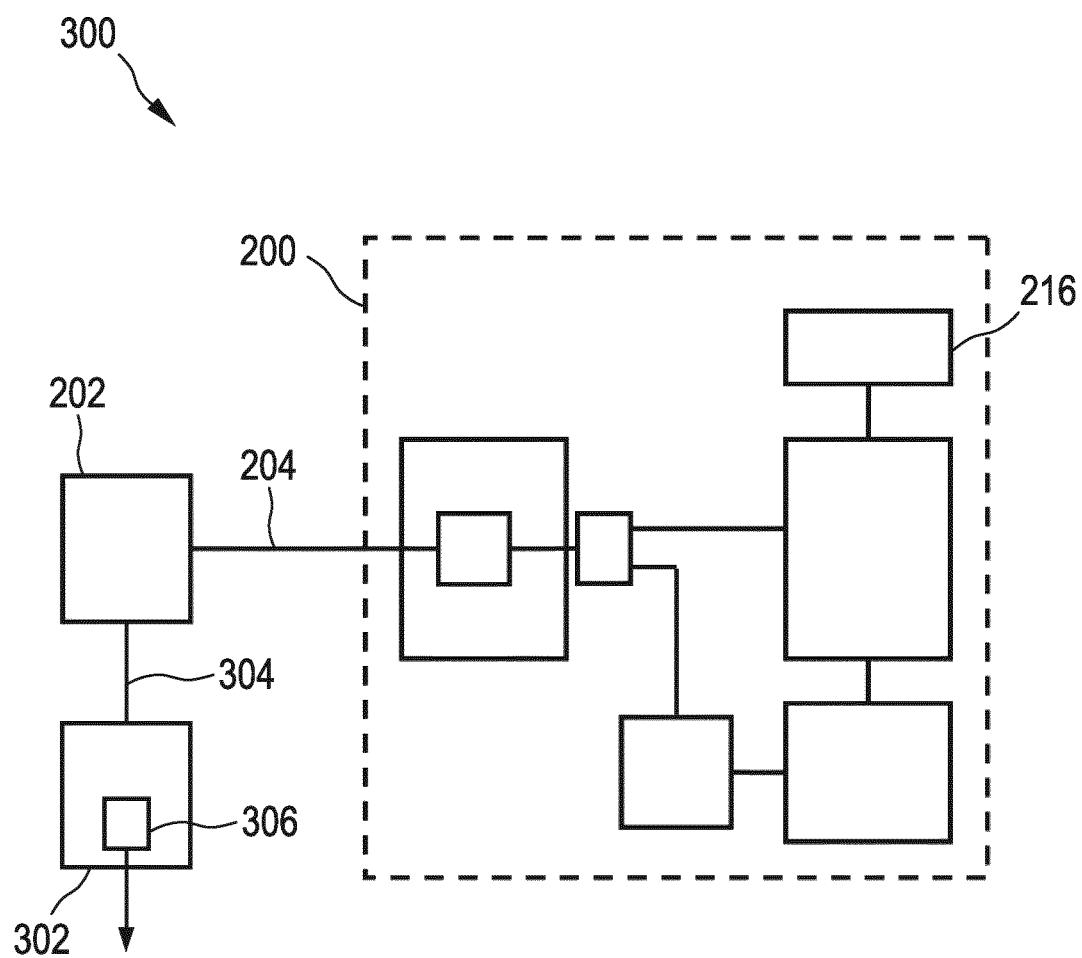
FIG. 3 shows a block diagram of another embodiment of an electrical arrangement.

FIG. 3 shown an exemplary embodiment of an electrical arrangement 300 comprising a DC-powered device 200 connected to a power sourcing equipment 202 via an Ethernet cable 204 configured to convey both DC-power and operational data. The electrical arrangement further comprises a monitoring device 302, connected to the PSE via a data connector 304 which is in some embodiments also an Ethernet cable. In other embodiments the monitoring device is connected wirelessly to the electrical arrangement. In other embodiments the monitoring device is configured as a monitoring unit which is integrated in either a power sourcing equipment or in a DC-powered device of the electrical arrangement. The monitoring device 304 is configured to access the log data stored in the storage unit 216 and to output, via a user interface 306, output data pertaining to the accessed log data. The output data is therefore valuable data for monitoring, tracking and learning about unallowed accesses to the DC-powered devices and can be used by an operator or another device to profile the unallowed access by the potential attacker. It is also valuable data to check for sources of errors in the arrangement since it also keeps track of erroneous or not understood operational not necessarily pertaining to an unallowed attempt to access the DC-powered devices.

Figure 4:
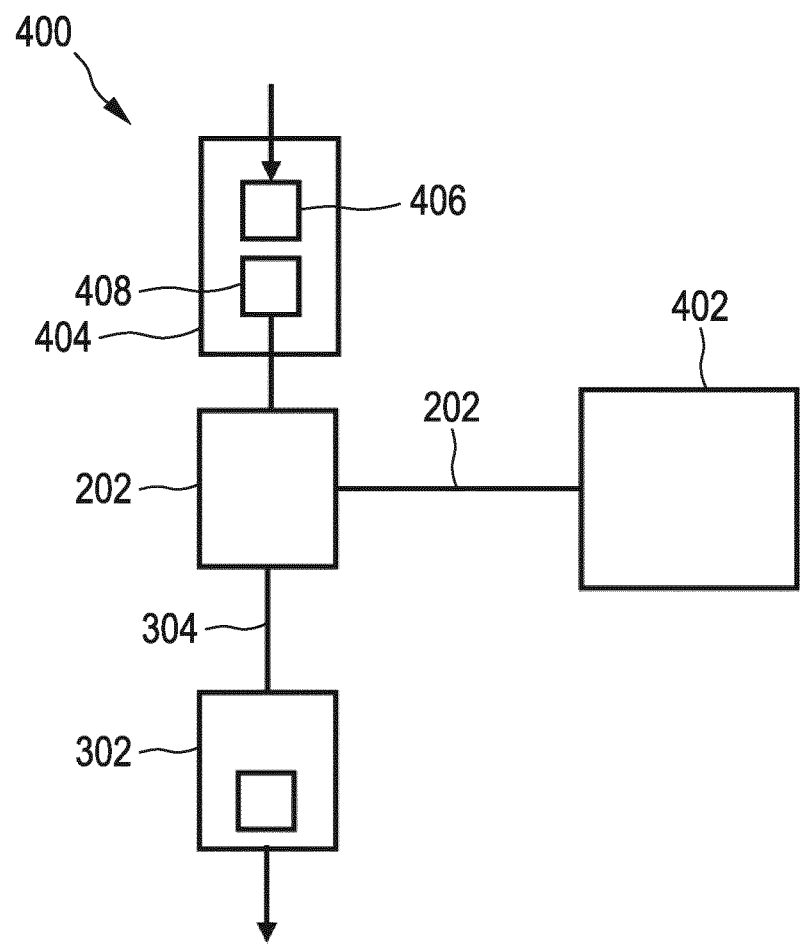
FIG. 4 shows a block diagram of another embodiment of an electrical arrangement.

FIG. 4 shows another exemplary embodiment of an electrical arrangement 400 comprising a DC-powered device 402 connected to a power sourcing equipment 202 via an Ethernet cable 204 configured to convey both DC-power and operational data. The electrical arrangement further comprises the monitoring device 302, connected to the PSE via data connector 304. The electrical arrangement also comprises a management device 404 which is configured to receive via a management input interface 406 the allowed operational template data and extended functionality template data, and to transmit, via a management output interface 408, the allowed operational template data and the extended functionality template data to the DC-powered device via the power sourcing equipment 202. The DC-powered device 402 is further configured to receive the above mentioned template data and to store them so that the data processing unit 214 can compare the exchanged operational data with them. In this example, the managing device is therefore configured to send the templates to a DC-powered device which is configured to store them. Thus, an external user can modify a set of operational instructions pertaining to the exchanged operational data corresponding to the allowed template data. The DC-powered device is also configured to modify a set of operational instructions pertaining to the unallowed operational data corresponding to the extended functionality template data. In this exemplary embodiment, an external operator may use the management device to modify, for example, the opened software communication port at which operational instructions will be exchanged and executed even if they pertain to unallowed operational data. In this way, the DC-powered devices of the electrical arrangement may vary their extended functionality so as to give the potential attacker the illusion of a large variety of networked devices.

Figure 5:
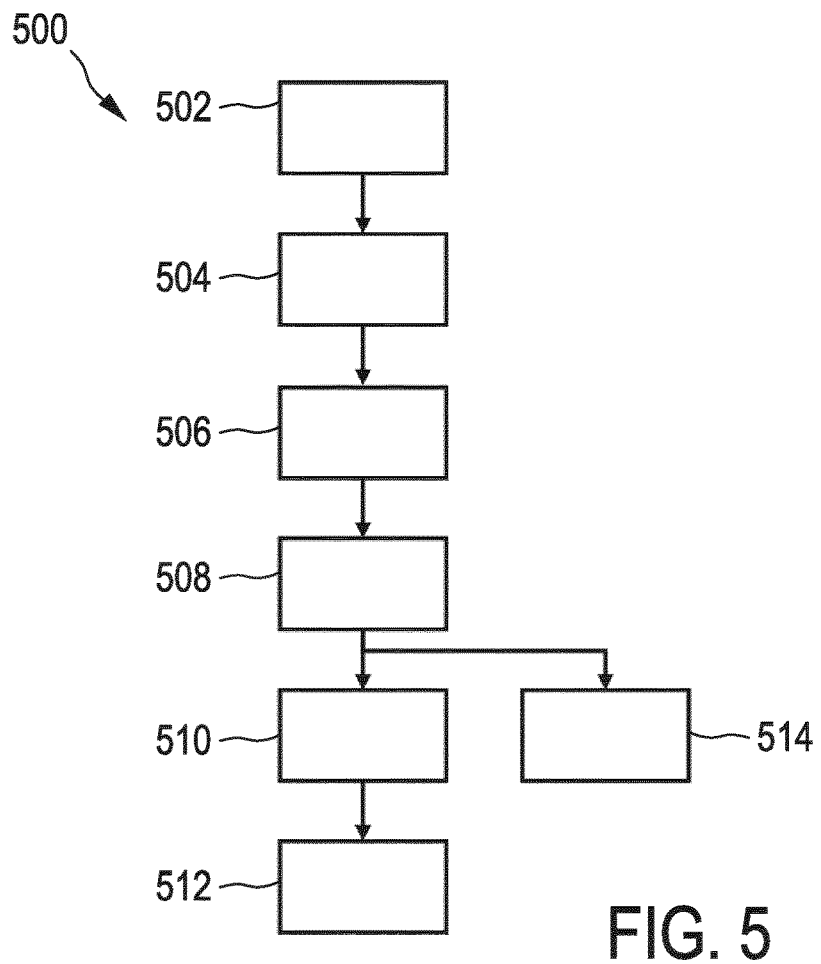
FIG. 5 shows a flow diagram of an exemplary embodiment of a method for operating a DC-powered device.
Figure 6:
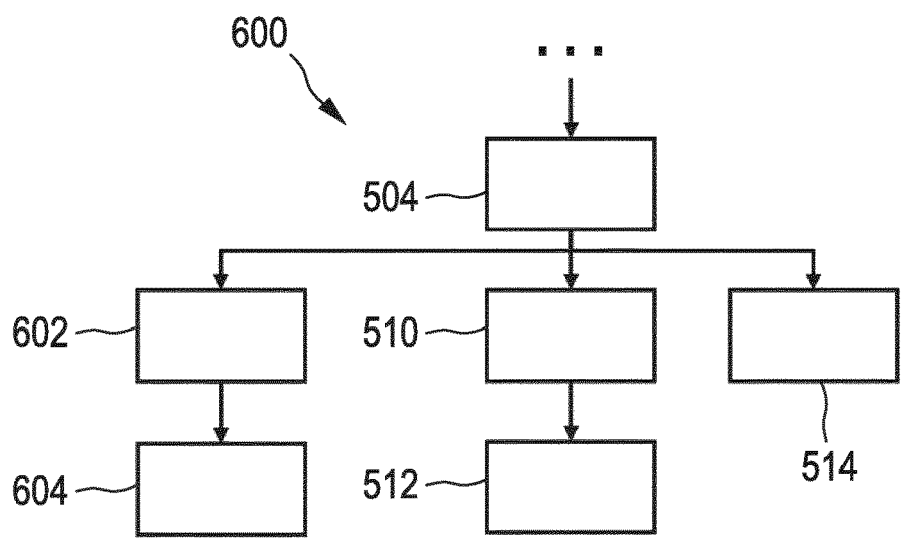
FIG. 6 shows a flow diagram according to another embodiment of a method for operating a DC-powered device

FIG. 5 shows a flow diagram of an exemplary embodiment of a method 500 for operating a DC-powered device configured to receive DC power from an external power sourcing equipment and to exchange operational data with the power sourcing equipment. The method 500 comprises receiving, in a first step 502, DC power from the power sourcing equipment and then, in a step 504, providing the DC power internally within the DC-powered device. The method also exchanges, in a step 506, operational data with the power sourcing equipment. In a step 508, the method compares the exchanged operational data with prestored allowed operational data. The method is thus configured to, upon determining if the exchanged operational data is allowed by comparing it, in step 508, with the allowed operational template data, to execute, in step 514, the corresponding operational instructions. If, on the other hand, the exchanged operational data is considered as unallowed in step 508, the method generates, in step 510, and stores in a storage unit, in a step 512, log data pertaining to unallowed operational data, the unallowed operational data being that exchanged operational data that does not correspond to the prestored allowed operational data FIG. 6 shows a flow diagram according to another embodiment of a method 600 for operating a DC-powered device. The method 600 follows the method 500 but it is further configured to compare, in a step 602, the unallowed exchanged operational data with prestored extended functionality template data, and to execute, in a step 604, operational instructions pertaining to the unallowed operational data corresponding to a prestored extended functionality template data.

Figure 7:
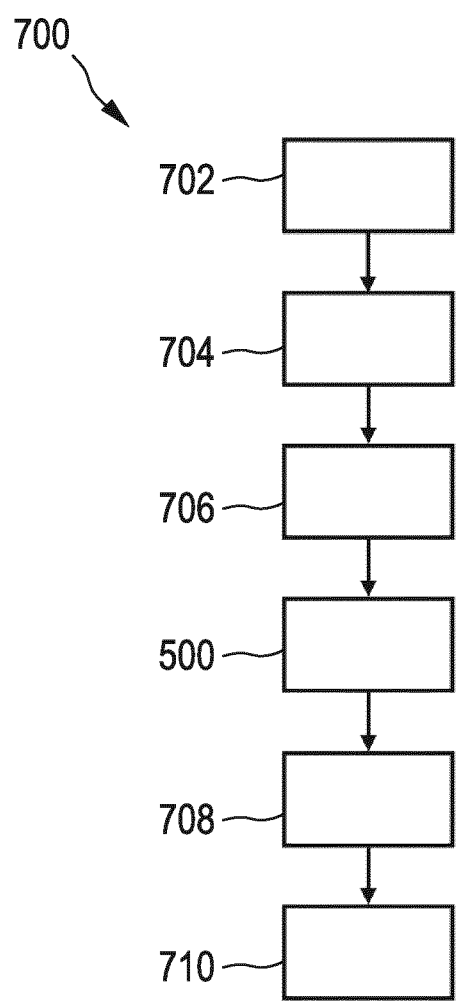
FIG. 7 shows a flow diagram of an exemplary embodiment of a method for operating an electrical arrangement.

FIG. 7 shows a flow diagram of an exemplary embodiment of a method 700 for operating an electrical arrangement. The method 700 comprises receiving, in a step 702, via a management input interface, the allowed operational data and/or the extended functionality template data. Then, in a step 704, the received template data are transmitted to the DC-powered device, where they are stored in a step 706. The method 700 further comprises performing the method 500. In other embodiments the method 700 further comprises performing the method 600. When steps 702, 704, and 706 are carried out before the method 500 or 600 takes place, steps 702, 704 and 706 can be regarded as an initialization of the functionality of the DC-powered devices in the arrangement. They can, however, be performed while method 500 or 600 is being carried out. In this case, steps 702, 704 and 706 can be regarded as enabling a dynamic change of the extended functionality of the respective DC-powered device. The method 700 further comprises accessing, in a step 708, the log data stored in the storage unit of the DC-powered device and outputting, in a step 710, via a user interface, output data pertaining to the accessed log data. Steps 708 and 710 can be performed at any time and therefore the do not depend on a current status of method 500 or, in other embodiments, of method 600.

While the present invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single step or other units may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A luminaire configured to receive DC power from an external power sourcing equipment and to exchange operational data with the power sourcing equipment, the luminaire comprising:
    an interface unit, integrated within the luminaire, comprising at least one connection unit configured to receive the DC power from the external power sourcing equipment, to provide the DC power internally within the luminaire and to exchange operational data with an external data processing unit communicatively coupled to the external power sourcing equipment;
    a luminaire data processing unit, integrated within the luminaire, connected to the interface unit and configured to receive the internally provided DC power from the interface unit, compare the exchanged operational data with prestored allowed operational template data and to generate and store, in a storage unit integrated within the luminaire, log data pertaining to unallowed operational data, the unallowed operational data being any exchanged operational data that does not correspond to the prestored allowed operational template data; and
    a luminaire unit, integrated within the luminaire, which receives the DC power from the interface unit, configured to emit light in dependence on control information by executing operational instructions pertaining to that exchanged operational data corresponding to the prestored allowed operational template data,
    wherein the prestored allowed operational template data comprises data pertaining to instructions intended for one or more of:
    switching on the light emittance of the luminaire unit,
    switching off the light emittance of the luminaire unit,
    changing the illumination intensity, by a predetermined amount, of the light emittance of the luminaire unit, and
    changing the light spectrum, by a predetermined amount, of the light emittance of the luminaire unit.

2. The luminaire of claim 1 wherein the luminaire data processing unit is further configured to:
    compare the unallowed operational data with prestored extended functionality template data;
and wherein the operational unit is further configured to:
    to execute operational instructions pertaining to that unallowed operational data corresponding to the prestored extended functionality template data.

3. The luminaire of claim 2, wherein
    the prestored allowed operational template data further comprises port template data defining a limited set of allowed software communication ports to be used for exchanging the operational data, and wherein
    the luminaire data processing unit is further configured:
    to identify, within the respective exchanged operational data, software communication port data; and
    to compare the software communication port data with the set of allowed software communication ports.

4. The luminaire of claim 1, wherein the data processing unit is configured to determine whether the luminaire unit is in an active or inactive operational state and to generate and store the log data only when the luminaire unit is in an inactive operational state.

5. An electrical arrangement comprising at least one power sourcing equipment configured to provide DC power to one or more DC-powered devices and to exchange operational data with the one or more DC-powered devices, wherein at least one of the one or more DC-powered devices connected to the power sourcing equipment is a luminaire according to claim 1.

6. The electrical arrangement of claim 5, further comprising a monitoring device configured to access the log data stored in the storage unit of the luminaire; and
    output, via a user interface output data pertaining to the accessed log data.

7. The electrical arrangement of claim 5, further comprising a management device configured to:
    receive via a management input interface the allowed operational template data or the extended functionality template data;

transmit via a management output interface the allowed operational template data or the extended functionality template data to the luminaire; and wherein the luminaire is configured to receive the allowed operational template data or the extended functionality template data and to store the allowed operational template data or the extended functionality template data.

8. The electrical arrangement of claim 7, wherein the management device is additionally configured to:
receive via the management input interface the computer program and to instruct the luminaire to install the computer program for execution during operation of the luminaire.

9. A luminaire configured to receive DC power from an external power sourcing equipment and to exchange operational data with the power sourcing equipment, the luminaire comprising:
an interface unit comprising at least one connection unit configured to receive the DC power from the power sourcing equipment, to provide the DC power internally within the luminaire and to exchange operational data with the power sourcing equipment;
a data processing unit connected to the interface unit and configured to compare the exchanged operational data with prestored allowed operational template data and to generate and store, in a storage unit, log data pertaining to unallowed operational data, the unallowed operational data being any exchanged operational data that does not correspond to the prestored allowed operational template data; and
a luminaire unit, which receives the DC power from the interface unit, configured to emit light in dependence on control information by executing operational instructions pertaining to that exchanged operational data corresponding to the prestored allowed operational template data,
wherein the prestored allowed operational template data comprises data pertaining to instructions intended for one or more of:
switching on the light emittance of the luminaire unit,
switching off the light emittance of the luminaire unit,
changing the illumination intensity, by a predetermined amount, of the light emittance of the luminaire unit, and
changing the light spectrum, by a predetermined amount, of the light emittance of the luminaire unit;
wherein the data processing unit is further configured to:
compare the unallowed operational data with prestored extended functionality template data;
detect a reoccurrence of a given unallowed operational data by detecting a predefined minimum amount of data overlap with unallowed operational data already stored in a log data entry, and to generate and replace the log data entry by a compressed log data entry, the compressed log data entry providing an identification of the given unallowed operational data and of a number of reoccurrences of the given unallowed operational data; and
wherein the operational unit is further configured to:
to execute operational instructions pertaining to that unallowed operational data corresponding to the prestored extended functionality template data.

10. A method for operating a luminaire configured to receive DC power from an external power sourcing equipment and to exchange operational data with the power sourcing equipment, the method comprising:
exchanging operational data with an external data processing unit communicatively coupled to the power sourcing equipment;
comparing, using a luminaire data processing unit integrated within the luminaire, the exchanged operational data with prestored allowed operational data;
generating and storing, in a storage unit integrated within the luminaire, log data pertaining to unallowed operational data, the unallowed operational data being that exchanged operational data that does not correspond to the prestored allowed operational data; and
emitting light using a luminaire unit integrated within the luminaire in dependence on control information by executing operational instructions pertaining to that exchanged operational data that corresponds to the prestored allowed operational data,
wherein the prestored allowed operational template data comprises data pertaining to instructions intended for one or more of:
switching on the light emittance of the luminaire unit,
switching off the light emittance of the luminaire unit,
changing the illumination intensity, by a predetermined amount, of the light emittance of the luminaire unit, and
changing the light spectrum, by a predetermined amount, of the light emittance of the luminaire unit.

11. The method of claim 10, further comprising:
comparing, using the luminaire data processing unit, the unallowed exchanged operational data with prestored extended functionality template data; and
executing operational instructions, using the luminaire data processing unit, pertaining to the unallowed operational data corresponding to a prestored extended functionality template data.

12. A computer program product for controlling a data processing unit in controlling operation of a luminaire, the computer program product comprising program code for causing the data processing unit to carry out the method as defined in claim 10, when the computer program product is run on the data processing unit.

13. A method for operating an electrical arrangement, the method comprising:
operating at least one power sourcing equipment for providing DC power to at least one or more DC-powered devices and for exchanging operational data with the one or more DC-powered devices;
wherein at least one of the one or more DC-powered devices connected to the power sourcing equipment is a luminaire arranged to perform the method according to claim 10.

14. The method of claim 13, further comprising:
accessing the log data stored in the storage unit of the luminaire; and
outputting, via a user interface, output data pertaining to the accessed log data.

* * * * *